US006889542B2

(12) United States Patent
Deverre et al.

(10) Patent No.: US 6,889,542 B2
(45) Date of Patent: May 10, 2005

(54) PROCESS AND DEVICE FOR TIRE UNSEATING TEST

(75) Inventors: Luc Deverre, Gerzat (FR); Jean-Paul Keller, Pont-du-Château (FR); Patrick Rachez, Blanzat (FR)

(73) Assignee: Michelin Recherche et Technique S. A., Granges-Paccot (CH)

( * ) Notice: Subject to any disclaimer, the term of this patent is extended or adjusted under 35 U.S.C. 154(b) by 0 days.

(21) Appl. No.: 10/693,992

(22) Filed: Oct. 28, 2003

(65) Prior Publication Data

US 2004/0083803 A1 May 6, 2004

Related U.S. Application Data

(63) Continuation of application No. PCT/EP02/04809, filed on May 2, 2003.

(30) Foreign Application Priority Data

May 3, 2001 (FR) .............................. 01 05948

(51) Int. Cl.[7] .............................................. G01M 17/02
(52) U.S. Cl. ........................................................ 73/146
(58) Field of Search ................................ 73/146–146.8

(56) References Cited

U.S. PATENT DOCUMENTS

| 2,695,520 A | | 11/1954 | Karsei |
| 3,662,597 A | | 5/1972 | Deghetto |
| 5,040,413 A | * | 8/1991 | Ohms .......................... 73/146 |

FOREIGN PATENT DOCUMENTS

| DE | 12 48 336 B | | 8/1967 | |
| JP | 09169203 A | * | 6/1997 | ........... B60C/23/06 |

* cited by examiner

*Primary Examiner*—Edward Lefkowitz
*Assistant Examiner*—Jermaine Jenkins
(74) *Attorney, Agent, or Firm*—Burns, Doane, Swecker & Mathis, L.L.P.

(57) ABSTRACT

Processes and machines for the unseating test for a mounted assembly, wherein, on the machine, the test (or "load") forces are transmitted only in a normal direction, that is to say by that part of the tire intended to be in contact with the ground, that is to say under normal conditions the "crown" of the tire (substantially the tread) and, under extreme test conditions, the crown, the "shoulder" and ultimately the "sidewall" of the tire. Operation may be in static mode (wheel on a test plate) or in dynamic mode (wheel rolling with drift on a test drum or other test surface).

20 Claims, 6 Drawing Sheets

PROCESS AND DEVICE FOR TIRE UNSEATING TEST

The present invention is a continuation of International Application No. PCT/EP02/04809, filed May 2, 2003, published in French as WO 02/090919 A1, which claims priority to French Application No. 01/05948, filed May 3, 2001, both of which are incorporated by reference.

The present invention relates to the technical sector of rolling assemblies comprising essentially, as far as the scope of the present invention is concerned, a tire and a rim.

More precisely, the invention relates to the methods or processes, and devices, for tests which make it possible to study the behaviour of an assembly of this type, under various types of rolling conditions, faced with the phenomenon of what is called unseating of the bead (also referred to as "heel"), which corresponds to the bead (or "heel") of the tire moving out from all or part of the seat of said bead on the rim, resulting in an immediate loss of airtightness and hence a sudden drop in the inflation pressure of the tire, generally accompanied by dramatic deformations of the tire.

The general problem posed is therefore that of preventing the accidental unseating of a tire under certain conditions.

A distinction is made between two types of unseating, the first resulting from certain driving conditions, for example in the event of a violent impact on the sidewall and/or the tread of the tire, such as an impact against a kerb, a traffic "island", or a hole in the road surface. The present invention is not concerned with these causes of unseating, a priori.

The second cause of unseating results for example from driving in a rut on loose ground, etc., or in the presence of very great mechanical stresses exerted on the sidewall and/or the tread, for example when cornering tightly at high speed, all possibly aggravated by an inflation pressure which does not correspond to the operating pressure, or aggravating factors of this type. The invention relates to the unseating produced by this second type of cause.

The prevention of unseating involves better understanding of the behaviour of the rolling assembly under certain stresses, which then helps to design improved profiles of rims, tires and similar elements.

This better understanding is in turn aided by testing machines.

The precise problem with which the person skilled in the art is confronted here is therefore to conceive of an improved method and testing machine, that is to say, one which makes it possible to refine understanding of the phenomena of unseating of tires, and therefore to provide better technical solutions thereto.

Naturally, one important aspect of the problem posed lies in the ability, for the method and the machine, to be capable of carrying out tests on a range of simulation of driving conditions which is as broad and diversified as possible, and also capable of adapting to different sizes of tires.

One even more important aspect of the problem posed lies in the necessity of producing an excellent correlation between the results of tests on machine and the tests on track, and finally the actual road tests, for example in a rally or similar extreme situations, generally with the "vehicle test".

U.S. Pat. No. 3,662,597 is known, which describes a tire testing machine, capable of carrying out both bead unseating tests and tests of mechanical strength of completely different nature and design.

This patent emphasises that such machines must be constructed with precision because on one hand they exert considerable pressures, using complex movements, whereas on the other hand the validity of the test naturally depends on the precision of the force imposed by the machine, and on its resistance to "distortion". The problems mentioned above are accentuated thereby, the machines are very expensive, and it is desired to design a multi-use machine. It is furthermore advisable to avoid any factor which might distort the result and/or interpretation of the test, and in particular any flexing, under the forces applied, of the frames and other supports of the wheel or mounted assembly: provision therefore has to be made for costly oversizing of such parts, in this field in particular.

According to that patent, the tire is mounted on the rim, then the latter is bolted on to its support. A conical form, the arm of which is adjustable in length so as to adapt to different tires, comes into contact with the sidewall of the tire, and the tire is rotated manually until the lower conical part of said form is in correct contact with the sidewall.

Then a pressure is applied against the sidewall of the tire by a hydraulic means (FIGS. 1–5).

A different arrangement of the means of the machine makes it possible (FIG. 6) to carry out a completely different test of the mechanical resistance to rupture of the "crown" of the tire by applying the pressure by an indenter ("plunger") on the tread of the tire.

The person skilled in the art will understand that in this case of testing the resistance to rupture of the crown of the tire, what is applied is not a force intended to study the "lateral" deformation of the tire but a violent "impact" on a very small surface area of the crown, intended to mechanically destroy the crown of the tire.

BRIEF DESCRIPTION OF THE DRAWINGS

Other characteristics and advantages of the invention will be better understood on reading the following description, and referring to the attached drawings, in which:

FIG. 2 shows a diagram of the load forces applied to a tire and their components, here again in order to specify the terminology used.

FIG. 2 is composed of Figures:

2a general case.

2b specific case where the normal component is zero.

2c specific case where the longitudinal component is zero.

FIG. 3 shows a dynamic embodiment of the invention, "test drum" option, and is composed of FIGS. 3a (perspective view of the testing machine) and 3b (top view of FIG. 3a).

Figure 1:
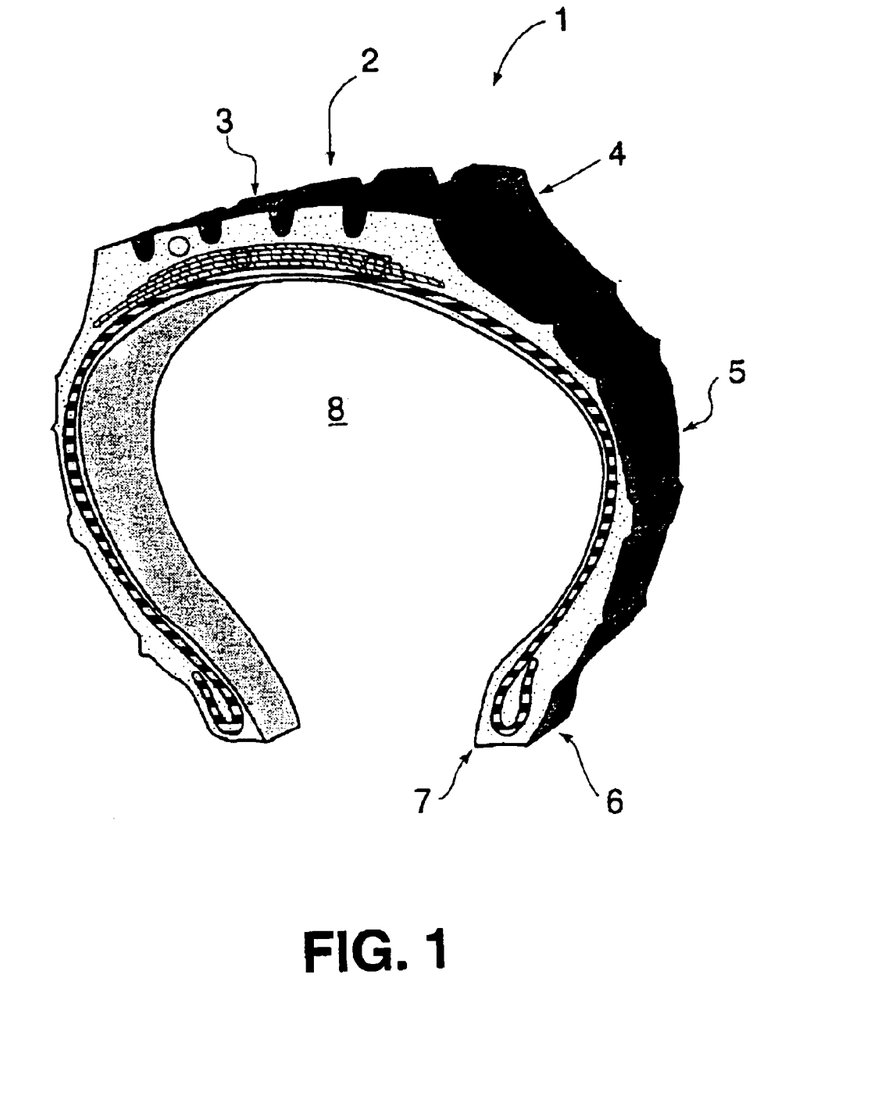
FIG. 1 shows a tire in section in order to explain the vocabulary used in the present application; the model of tire shown is of course in no way limitative.
Figure 2A:
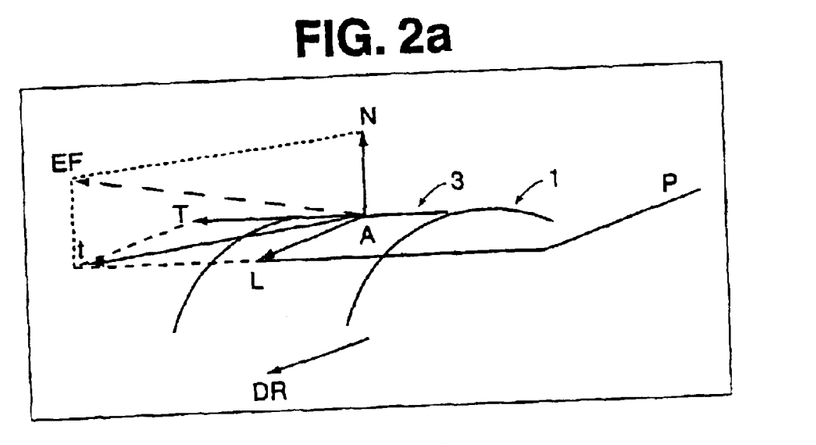
Figure 2B:
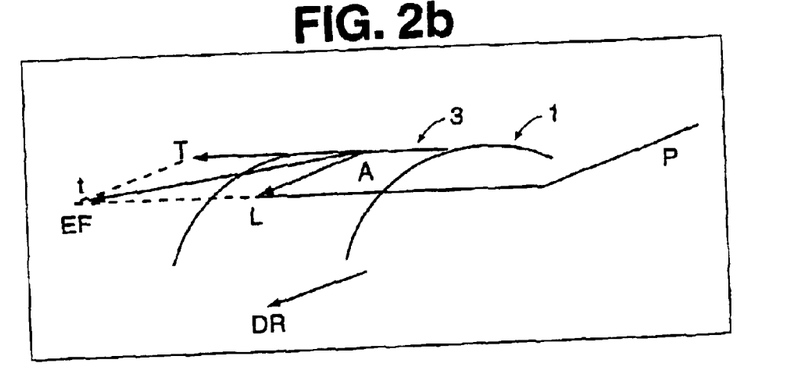
Figure 2C:
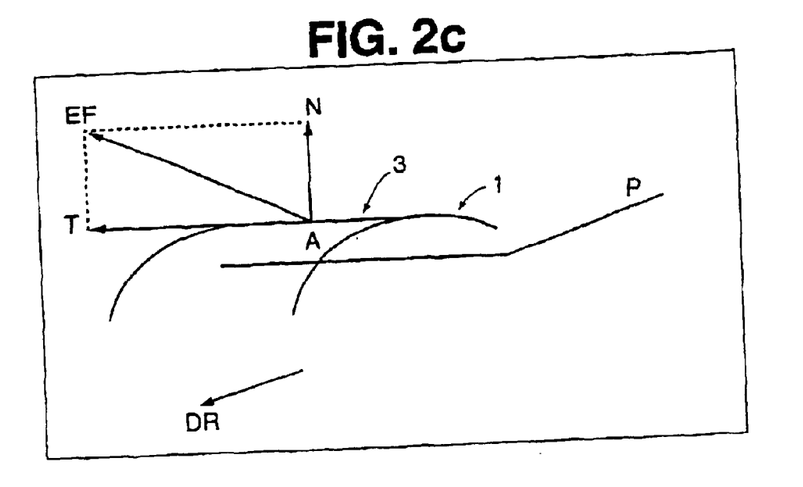
Figure 3A:
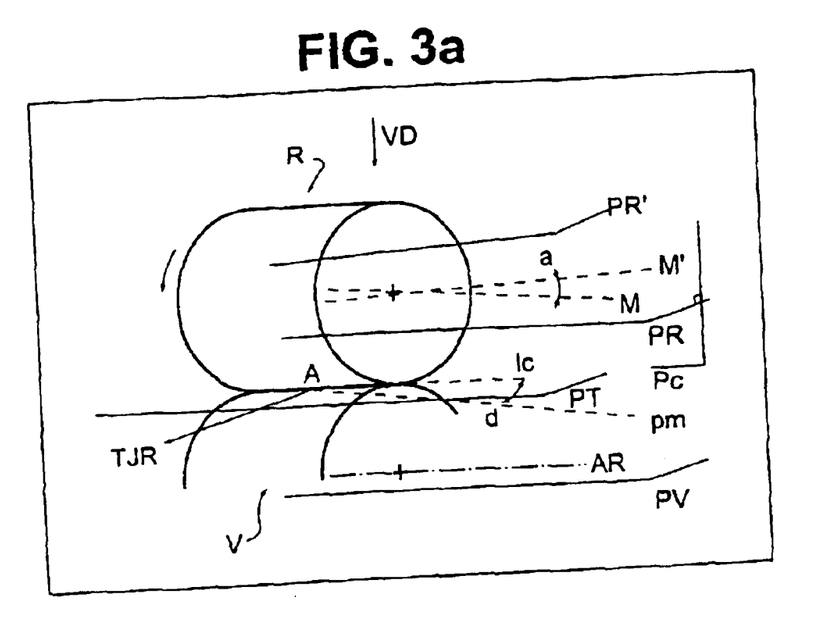
Figure 3B:
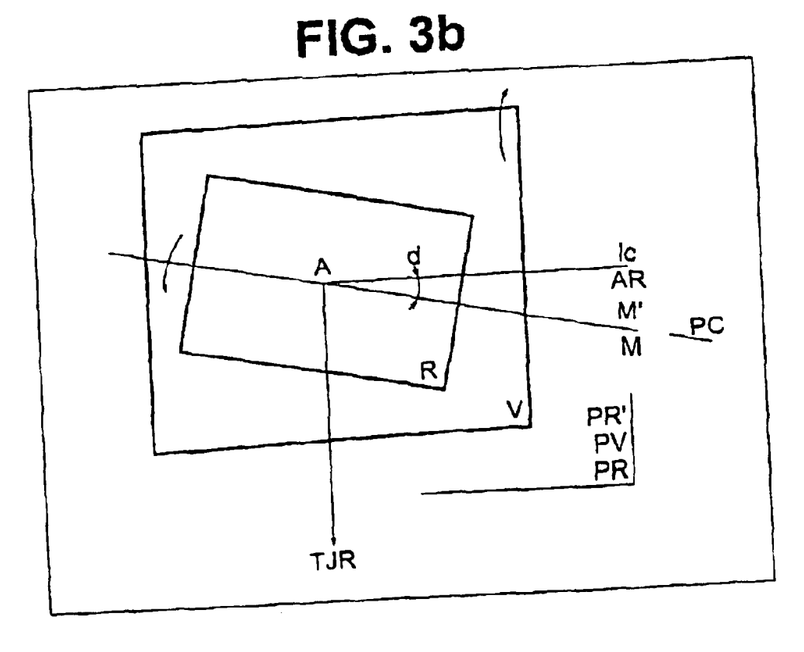

In the attached figures, the same references have the same meanings, which are as follows:

1 tire
2 crown of the tire
3 tread
4 shoulder of the tire
5 sidewall of the tire
6 bead or heel of the tire
7 bead toe for bead 6
8 inner cavity
A point of application of the load force
P horizontal plane tangent to the tread at A
DR direction of rolling
N normal component of the load force
T transverse component of the load force
L longitudinal component of the load force
t tangential component of the load force (resultant of the vectors T and L, which is located in the plane P)
EF load force (resultant of vectors N, T and L).
a camber angle
d drift angle
TJR trajectory of the rolling assembly R
1c perpendicular to TJR
R rolling assembly
V test drum
M hub (or axis of the hub) of the rolling assembly
M' hub (or axis of the hub) of the rolling assembly in the case where a camber a is imposed
AR axis of rotation of the test drum V
A one of the points of contact between rolling assembly and reference surface
PV plane containing AR
PR plane containing M
PR' plane containing M' (PR and PR' therefore together form the camber angle a)
PC plane containing M and M' (therefore, perpendicular to PR and PV)
VD direction in which FIG. 3a is considered in order to form the "top view" FIG. 3b
microperforated plate
solid plate, in contact with the tire 1
60 line of contact between the plate 20 and the tire 1
50 microperforations via which pressurised AIR is injected
30 gap between the plates 10 and 20
40 "strained film" of air.
70 strip (coating) to increase the coefficient of friction

DETAILED DESCRIPTION

The present invention will be better understood on reading the following description, and the non-limitative example below.

The present invention generally relates to processes and machines for the unseating test for a mounted assembly (that is to say an assembly formed of a rim, a tire without an inner-tube ("tubeless") and the inflation air of the inner cavity of the tire at the operating pressure or another pressure, in particular a test pressure), wherein they transmit, on the machine, the test (or "load") forces only in a direction referred to here as "normal" for simplicity, that is to say by that part of the tire intended to be in contact with the ground, that is to say under normal conditions the "crown" of the tire (substantially the tread) and, under extreme test conditions, the crown, the "shoulder" and ultimately the "sidewall" of the tire.

The person skilled in the art is naturally familiar with these names, which form part of his everyday professional vocabulary.

The general principle of the invention—process and testing machine-is therefore to apply the test or "load" forces in a direction referred to as "normal", in accordance with the convention defined above.

It will be emphasised that "normal" does not necessarily indicate "perpendicular to the tread", for example, but solely the fact that the load forces are applied to the parts of the tire specified further above. "Normal" is understood to mean contrasting the invention with the principle of the prior art, which was to apply a "transverse" force to the sidewall (cf. abovementioned USP). It will therefore have been understood that a "normal force" according to the invention may be applied in an oblique direction, as will be described in detail below.

It will be noted that, under certain ultimate test conditions, the tire may no longer be in contact except via the sidewall, the airtightness however still being ensured-fleetingly-by the bead toe of the tire. There is a "separation" situation but not yet an unseating situation.

The industry on the contrary uses processes which transmit the test force via the sidewall of the tire, as is perfectly illustrated by the US patent above. It will also be noted that the fact that, according to the invention, the test by "normal force" can lead the tire, in the entirely ultimate phase of the test, to be in contact with the ground by means of the sidewall must in no way be confused with the tests of mechanical rupture of the crown, where the forces are transmitted directly and deliberately to the sidewall. According to the invention, if the sidewall comes into contact with the test surface, this is merely the consequence of certain test situations, resulting in extreme deformation, in the ultimate phase of the test, called separation phase, and not the test method.

The invention also relates to the testing machines which make it possible to, or are adapted to, implement said processes.

For simplicity, what will be indicated for the "processes" will not be unnecessarily duplicated for the "machines", throughout the present application, including the claims, except for specific cases necessary for clarity or for proper understanding. Thus, if a "process" is described and claimed as comprising a "compression means", the person skilled in the art will understand that the invention covers the testing machine comprising such a compression means, under the conditions described in relation to the "process".

There have been discovered and developed two specific types of processes based on this general principle referred to as "normal force": one static (the tire does not rotate); the other virtually static (the tire rotates on a test drum).

In both cases, a load (or force) is exerted on the tread of the tire inflated to its operating pressure or to another test pressure, until the start of unseating of the tire occurs, at the bead; at this moment the force applied and the internal pressure of the tire are noted or recorded.

As specified further above, the tire may, just before this moment, be deformed by the load to such an extent that, in fact, the shoulder or even the sidewall are fleetingly in contact with the test surface. Hereafter, "tread" will be used for simplicity, and also because the principle of the test according to the invention is to apply the normal load force, essentially, and during the major part of the test, on said tread.

The procedure is like this for various test conditions, in particular various pressures or other configurations.

The start of unseating may be detected by the audible hissing of the air escaping from the inner cavity of the tire. Inflation pressure sensors may also be provided. Naturally, the force applied (generally on the x-axis) and the inflation pressure (generally on the y-axis), that is to say the pressure of the inner cavity of the tire, may also be recorded continuously, including beyond the starting point of unseating.

Conventions

Throughout the present application, it will be considered by simple convention and convenience that:

- in the static mode, the surface or plate is beneath the wheel, and any jack is located above the wheel, all in the vertical axis,
- in the virtually static mode, the test drum or the running surface is located beneath the wheel,
- the axes of rotation and hubs are horizontal, unless otherwise indicated (for example except for camber angle when mentioned).

The person skilled in the art will understand that the invention also covers, without it needing to be described, the inverted modes or modes arranged at various relative inclinations of the mounted assembly and the parts for applying the "normal" force, which may correspond to particular applications and to specific measurements.

Likewise, "normal force" and "normal" have been defined above by convention, as has "tread".

Static Mode

The invention relates more specifically but non-limitatively to a first embodiment referred to as "static process" wherein the rolling assembly is arranged on a test surface and is subjected to a "normal" test force, on the crown of the tread, by at least one pressure or compression means (hereafter "compression means" for simplicity).

"Normal test force, on the crown of the tread" is understood here (cf. attached FIG. 2) to mean that the force will be exerted on the crown of the tread and has at least one tangential component t other than zero.

As can be seen in FIG. 2, the "normal" force EF according to the invention, with the aim of simplified schematic representation which the person skilled in the art will be able to interpret, assumed to be applied at a point A of the tread. It is possible to define three components of this normal force EF, which are:

- the longitudinal component L (parallel to the direction of rolling DR, therefore "horizontal" according to the above conventions, and tangent at A to the tread),
- the transverse component T (perpendicular to the component L, and tangent at A to the tread, therefore also horizontal), the components L and T therefore defining a "horizontal" plane P (in accordance with the above conventions) and tangent at A to the tread 3 and
- the normal component N perpendicular at A to this plane.

The resultant of these three components, the possible modulations of which will be seen below, forms the vector of the "normal" force EF.

As explained above, the notion of "normal" force is a convention which means that the load force is applied according to the invention to the crown of the tire. On the other hand, the invention has the essential characteristic of applying a load force EF which has at least one tangential component t other than zero whereas the normal component N may be zero according to the invention (FIG. 2b). Therefore "normal force" (EF) and "normal component" (N) should not be confused.

Although the invention comprises the particular case in which the normal component N is zero, FIG. 2b, this corresponds to a situation in which, as the person skilled in the art will understand, the tire 1 would be glued to the test surface, which corresponds to a coefficient of tire/test surface friction which is rendered artificially infinite. This is not however the case which will be favoured, but it is not ruled out according to the invention.

According to one variant of the invention, the longitudinal L and normal N components being zero, the tangential component t is merged with the transverse component T.

It should be noted that "transverse component T" must not be confused with the prior art, represented for example by the aforementioned USP patent, where the test force is applied transversely but on the sidewall of the tire. According to the invention, the transverse component is applied to the crown of the tread, which is fundamentally different.

According to one variant of the invention, the longitudinal component is not zero and, to avoid running of the wheel, provision is made to apply to the wheel and/or its hub a driving or braking torque, by a known means such as an engine, a brake, and the like, which it is unnecessary to describe.

According to a preferred variant of the invention, the normal component N is not zero.

According to one preferred embodiment, the longitudinal component L is zero, the load force (FIG. 2c) does not comprise a longitudinal component and comprises only a normal component and a transverse component, the resultant normal force EF therefore being in a plane perpendicular to the plane P and to the direction of rolling DR.

The person skilled in the art will be able to envisage these variants and their consequences, advantages, and specific fields of application. The whole will be brought together for simplicity under the term "normal test force, on the tread", or similar term.

According to the invention, the load force EF may be applied to the crown of the tire by any means, referred to further above by convention as "compression means", that is to say by means of a controlled force applied to the test surface, by means of a controlled force applied to the hub of the mounted assembly which is undergoing the test, by means of a controlled force applied by a device acting directly on the crown of the tread, and by various combinations of these means.

The person skilled in the art will be able to envisage said combinations without difficulty as a function of the resultant vector EF which he will wish to create as a function of the specifications of the test to be carried out.

The test surface is of any sort, and in particular either solid (rigid or not rigid) or fluid (plate with a film of air or gas). A "ball plate" may be used.

It may be concave, convex, or of complex and/or evolutive shape, in order to adapt to specific test conditions. Thus a test surface the geometry of which will simulate or reproduce the footprint of a tire having a tread which has a tendency to "blister" can be used.

According to one preferred embodiment, this process comprises the use as surface of a plate which increases the coefficient of friction between the tread of the tire and said surface, with respect to a smooth surface, in order to increase the transmissible level of force "Y".

According to one preferred embodiment, said plate is notched, that is to say comprises grooves or notches substantially parallel to each other, the grooves being preferably arranged parallel to the direction "of rolling" (if the tire does roll).

According to one variant, a plate having pins is used, but this solution is less advantageous.

In both cases, the object is to obtain a mechanical indentation effect which increases the coefficient of friction of the tread on said plate, and therefore to set back the stress or force beyond which the tire will "slip"; using such indented surfaces therefore increases the range of use of the machine, but is not obligatory, and it is possible to use a smooth surface. It is however preferred to use surfaces which are indented or otherwise roughened.

Said compression means are selected from among the following combinations:

A the hub of the wheel is mounted fixed on a rigid frame external to the wheel, and the compression is obtained by the force exerted by a "suitable movement" of said surface or plate on the tread (that is to say on the contact area of the tire on said surface or plate).

"Suitable movement" will be used to designate for simplicity the movement (and therefore the force causing this movement) designed and controlled to apply to the tread the desired normal force (that is to say desired in intensity and spatial orientation, vector EF). It will be understood that the vector VF may be obtained by combining several forces and movements, whether relative or not, and that "suitable movement" also covers such situations. It will be recalled that, according to the essential characteristic of the invention, said "suitable movement" always comprises at least one tangential component t, which may possibly be reduced to a transverse component T, without it being necessary to be reminded of this on each occasion. Thus, for example, the mention of a "suitable movement" or displacement, and other similar terms, "downwards" implicitly indicates "suitable movement (or displacement) downwards comprising at least one tangential component t".

B the hub of the wheel is mounted to be mobile in lateral slides in which its ends can slide under the effect of an external lateral action, and the slides have an adjustable slope which imposes on the hub, owing to its forced lateral displacement, a "suitable movement", that is to say here a horizontal displacement downwards (that is to say towards the surface or plate) or, in the reverse movement, upwards, the load force increasing in the first case and decreasing in the second.

C the hub of the wheel is mounted to be vertically mobile, the surface or plate is fixed, and the hub may be forced—by an external action—in a "suitable movement" downwards (towards the surface or the plate) or conversely upwards, the load increasing in the former case and decreasing in the latter.

D the compressive force is applied to the crown of the tire opposite the surface or plate, by a compression means comprising an appropriate part for bearing on the tread, and the hub of the wheel is mounted freely vertically, whereas the surface or plate is fixed, which makes it possible for the tire to undergo loading under the action of the "suitable movement" of said part, or conversely relaxation.

E the compressive force is applied to the crown of the tire being tested by a second tire mounted beneath the tire being tested, which second tire is moved in a "suitable movement".

F according to one variant of the test E, it is possible to carry out the test with two superposed tires being tested, in contact by their respective treads.

It is important to note that, in the static mode considered here, the second tire exerting the compressive force does not roll (unlike the "test drum" which will be described below for the "dynamic" mode): said second tire is moved in a "suitable movement" and must not be confused with the "test drum" of the dynamic mode which, for its part, rolls.

G the above options are combined together, in particular:
G1 B (slides) and A (movement of the surface or plate)
G2 A (movement of the plate) and D (jack), the hub being fixed or free to move vertically.
G3 any other combinations and variants which will become clearly apparent to the person skilled in the art, and preferably seeking synchronisation of the relative movements in order to obtain the desired load slope.

The different "suitable movements" which have been described above both as a general principle and by means of several non-limitative examples are obtained by any mechanical, hydraulic or electromagnetic means, such as one or more engines, jacks, cams, of known type, alone or in various appropriate combinations in order to obtain the desired vector EF.

As indicated further above, when the "suitable movement" comprises a longitudinal component other than zero for the requirements of the test, furthermore means will be used which make it possible to prevent the wheel from rolling, that is to say means capable of applying a braking or (according, of course, to the direction of application of this torque) driving torque.

Of course, these means are controlled or driven by a programme and one or more interfaces as a function of the precise specifications of the test to be carried out, and in particular of the intensity and the direction of the vector EF, and possibly of its modulation over time, in intensity and/or direction.

In particular, the suitable movements of the plate or hub will preferably be obtained by one or more jacks.

The bearing part exerting (variant D) a compressive force on the crown of the tread opposite said plate may be formed by a second tire, or a part which is planar or of a suitable concavity for fitting to the form of the tire, in particular a plate "having a strained film of air" which will be described in detail below and in FIG. 4, and will be controlled by one or more jacks or other appropriate means.

Finally, the person skilled in the art will have understood that the various elements such as the plates or hub supports etc. . . . are held by extremely rigid elements comprising various known stress sensors or gauges.

Dynamic Mode

According to this specific mode of implementation of the process according to the invention with normal force applied to the tread, the rolling assembly is made to roll on a reference surface, imposing a drift d relative to said reference surface, and the normal force is applied as described for the static mode.

"Test Drum" Option

According to one preferred embodiment of this embodiment, the rolling assembly is positioned on a "test drum" which consists of a cylinder driven in rotation, the main function of which is to drive the tire in rotation, owing to its own rotation, by the play of the friction forces and to act as a reference surface for the application of the "suitable movement".

Reference will advantageously be made to the attached FIG. 3.

FIG. 3a illustrates said positioning and makes it possible to specify the geometric parameters.

FIG. 3b is a top view (projection) of FIG. 3a on a horizontal plane, in the direction VD (arrow) indicated in FIG. 3a.

In these two figures, it can be seen that the rolling assembly R is positioned above the test drum V.

The above conventions and the obvious possibilities of modifying these conventions will be recalled here only briefly.

The axis of rotation AR of the test drum lies in a plane PV parallel to the plan PR in which the hub M of the rolling assembly R is located.

Said "suitable movement" (as already defined in detail in the static mode) may be applied either solely by the test drum, or by the rolling assembly and the test drum, or by an additional compression means such as a plate, and by combinations of these means. Reference will be made here by analogy to the options and combinations described in detail for the static mode, mutatis mutandis.

In this "test drum" option the test can therefore be carried out with:

- a rolling assembly R mounted on a rigid fixed external frame, the test drum applying the "suitable movement",
- a test drum mounted on a fixed rigid external frame, the suitable movement being applied by the action of forces on the hub of the rolling assembly,
- a test drum and a rolling assembly each mounted on a mobile external frame, each exerting at least one component, or one part of a component, of the force vector EF,
- a test drum and a rolling assembly each mounted on a mobile or fixed external frame, and a plate exerting a load force on the crown of the tire being tested,
- a test drum and a rolling assembly each mounted on a mobile or fixed external frame, and an external means exerting a load force on the hub of the rolling assembly being tested and/or on the axis of rotation of the test drum,
- a test drum and a rolling assembly each mounted on a mobile or fixed external frame, and a second test drum, opposed to the first relative to the rolling assembly, exerting a load force on the crown of the tire being tested, and their combinations.

"Plate" Option

Still in dynamic mode, the test drum may be replaced by a plane or curved surface on which the rolling assembly is caused to roll.

Figure 4:
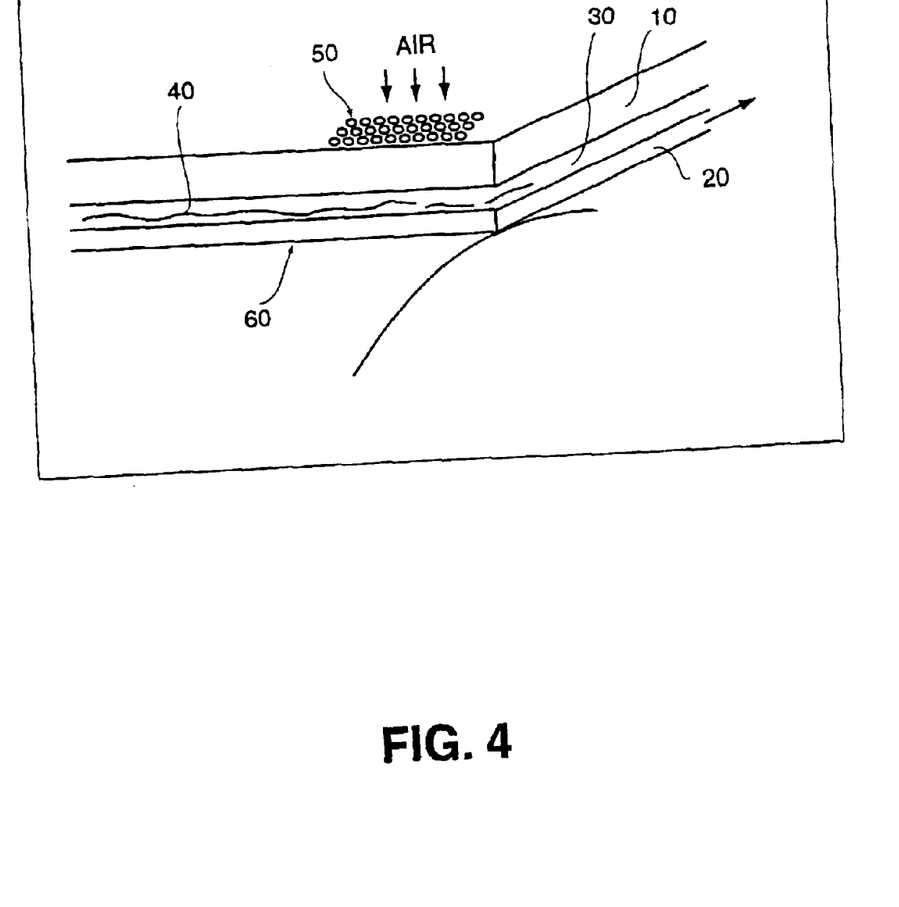
FIG. 4 also shows the dynamic embodiment of the invention, running-plate option, and more precisely running plate with compressed air (or gas) bed.

An example of such a plate is shown in the attached FIG. 4. This plate is formed of a first microperforated fixed plate 10 (upper, in the convention used), comprising a very large number of microperforations 50 into which air (or an inert gas) is injected under pressure, and a second solid plate 20, which is displaceable and is in contact with the tire 1 by the contact line 60, the two plates 10 and 20 being mounted such that there is a gap 30 between them, where a "strained film" of air may be produced.

Thus a pressure can be exerted on the crown of the tread of the tire 1 thanks to the pressure of the air, which is transmitted to the plate 20 by the strained film, which effects the desired "suitable movement", while effecting rolling of the tire on the lower face of the plate 20.

It is also possible to provide for simple rolling of the rolling assembly on a plate.

A simple rolling plate and a strained-air film plate intended to apply the "suitable movement" could also be combined.

One or the other of the test drum or plate options will be reverted to indiscriminately hereafter. It will be seen that they may furthermore be combined.

According to the invention, a drift d is always imposed. The drift angle d is defined as being the angle formed between the line 1c perpendicular to the "trajectory" TJR of the rolling assembly (which trajectory is perpendicular, in the direction of rolling of the test drum, to the axis of rotation AR of said test drum) and the axis of the hub M. The drift d appears in FIG. 3a as being the angle between the line 1c perpendicular to the trajectory TRJ and the projection pm of the hub M (or M' if a camber c is imposed).

The same definition would of course be valid, mutatis mutandis, with reference to a plate.

In entirely preferred manner, the wheel will be mounted on the test drum or the plate at a "drift" angle d of approximately 5 to 10 and up to 40 or 50°, the limits being the practical limits of the tests.

Thus one of the conditions of cornering is simulated. The person skilled in the art knows that, under normal driving conditions, the drift angle for a driver who is also normal is at most of the order of 3°. Therefore, according to the invention means are available for simulating extreme conditions.

It should be noted that, if no rolling drift were imposed, the unseating could not occur, and would therefore only be possible under the action of a violent impact, which is not the aim of the invention.

According to the invention, a camber angle a may also be imposed.

In the case where such a camber angle a is imposed, the hub is at M', and is located in a plane PC perpendicular to the planes PR and PV, that is to say that the hubs M and M' (with camber c) are in the same vertical plane PC.

The same definition would of course be valid, mutatis mutandis, with reference to a plate.

The imposed camber angle will be of the order of 2 to 5, 7 or 10°. Thus extreme conditions can also be simulated.

Possibly a castor angle of 0 to 3 or 5° approximately can also be imposed.

Finally, the person skilled in the art will have understood that it is extremely advantageous according to the invention to combine the drift angle and the camber angle, and possibly the castor angle, in various combinations, in order to simulate realistic conditions of cornering of normal to extreme use.

The speed of rotation of the test drum or of passage of the plate is advantageously within a range which might correspond to a rate of advance of a vehicle which cannot be zero but may be very low, and the sole upper limit of which is that imposed by the test, that is to say of the order of 1 to 100, preferably 1 to 60, preferably 1 to 40, and finally preferably 10 to 30 km/h, preferably around 20 km/h or standardised test 60 km/h K According to one preferred embodiment, the test drum is mounted on a fixed axis of rotation, and the hub of the wheel fulfils the function of compression means, in the sense that it may be driven in a "suitable movement" downwards (or the top) under the action of an external action, which compresses the area of contact on the test drum (or on the contrary relieves the pressure).

L According to another embodiment of the invention, the test drum and the wheel hub are mounted to be vertically mobile, and their "suitable movements" cooperate to compress or decompress the tread of the tire at the tread/test drum contact surface.

M According to one more preferred embodiment, the rolling assembly R is arranged on the test drum V, and a second test drum is arranged above the rolling assembly, this second test drum exerting the "suitable movement", alone or in cooperation with the first test drum, when the latter is driven in its own "suitable movement".

N According to other embodiments, the test drum is replaced by a plate, and the same relative mounting operations are effected, mutatis mutandis.

O According to one more, non-limitative, variant, a system of slides as described in the static mode is used to effect at least part of the "suitable movement", possibly with a special profile resulting in particular kinematic plays.

P Just like for the static mode, the non-limitative options K to N above may be variously combined, as a function of the vector EF to be created, which itself is defined by the specifications of the test.

Q In all the cases provided above, equally well the general case and the particular options, there may advantageously be provided, on one of the elements consisting of test drum, rolling assembly and/or other compression means, in particular plate, systems capable of applying a driving or braking torque. This option is particularly advantageous if applied to the rolling assembly, in particular the wheel centre or the hub M, because then the action and the effects of onboard electronic systems such as ABS™, ESP™ (trajectory control) and other sensors or sensor systems can be simulated.

According to yet one more preferred embodiment, the reference surface, in particular the test drum or the plate, is made of steel or alloy and its surface is smooth.

It is however preferable that its surface be such that it increases the coefficient of friction at the contact area, and thus be "adherised" (that is to say that the coefficient of friction is increased) by a coating (70) or striations or grooves or similar.

The dynamic process which has been described above is the process which, according to the invention, provides the best correlation with the on-road vehicle tests.

EXAMPLE I STATIC

Unseating on Notched Ground—Development of a Test 24/65-18 on 9 J 18 wheel

Aim

In the first part of the test, the conditions necessary for unseating these inflated rally tires loaded in static mode under "normal" force were sought.

Method

⇒Tires:

We have three assemblies mounted on a 9 J 18 wheel, centrally attached:
the $1^{st}$ with a "buffer" tire ref. A for setting up the test,
the $2_{nd}$ a control tire ref. B,
the $3_{rd}$ a tire the beads of which were glued to the wheel with a cyanoacrylate glue: ref. Tire C.

⇒Manipulation:

2 types of "ground" were used:
a plate having pins of a height of 1.5 mm which did not permit to unseat the buffer tire, but on which we effected measurements of transverse rigidity,
a notched plate of a height of 5 mm.

The forces N and T are limited to 2000 daN, the rates of the table and of application of the load are limited in number:

S table=50 and 200 mm/min. (S T)

SN=50 mm/min.

The conditions used to permit unseating are as follows:
hub locked,
camber and drift zero,
notched plate,
load N at the start 1000 daN,
rate of displacement table 50 mm/min.

Results.

⇒Unseating.

It was only possible to unseat on the notched plate for an initial load N of 1000 daN.

| Tire | Starting pressure in bar | Thrust daN | Unseating pressure bar |
|---|---|---|---|
| Tire B | 1.5 | 1650 | 1.82 |
| Control | 1.7 | 1700 | 2.11 |
| Tire C | 2.0 | 1850 | 2.30 |
| Glued | 1.5 | 1790 | 1.83 |
|  | 1.5 | 1910 | 1.83 |

Comment:

One test was performed again on the glued tire, at 180° from the first test.

For a starting pressure of 1.5 bar, a difference of 12% in favour of the glued tire was obtained.

EXAMPLE II DYNAMIC

Unseating on Notched Ground—Setting-Up of a Test

For this example, reference will be made to the attached FIG. 5 and the attached FIG. 6.

Method

Unseating under high drift

Aim

To measure the maximum thrust, under high drift, that the mounted assembly can withstand before unseating at an imposed inflation pressure.

Description

Preparation:

The mounted assembly is applied, at 30° drift and 6° camber, to the adherised test drum rotating at 2 km/h.

Force T=0

Force N<1500 daN

Force t<1000 daN (changes between 200 and 1000 daN in the test)

Invariable Parameters:

Inflation gas: air.

Type of pressure: free evolution for 5 levels of 0.5, 0.75, 1.0, 1.25 and 1.5 bar.

Ambient temperature between 20 and 30° C.

Dynamic rolling test without inner tube.

Variable Parameters:

Commercial wheel (diameter at the seat, width of rim, type of hook).

Direction of mounting (unseating in configuration FRL—front left)

Results

Figure 5:
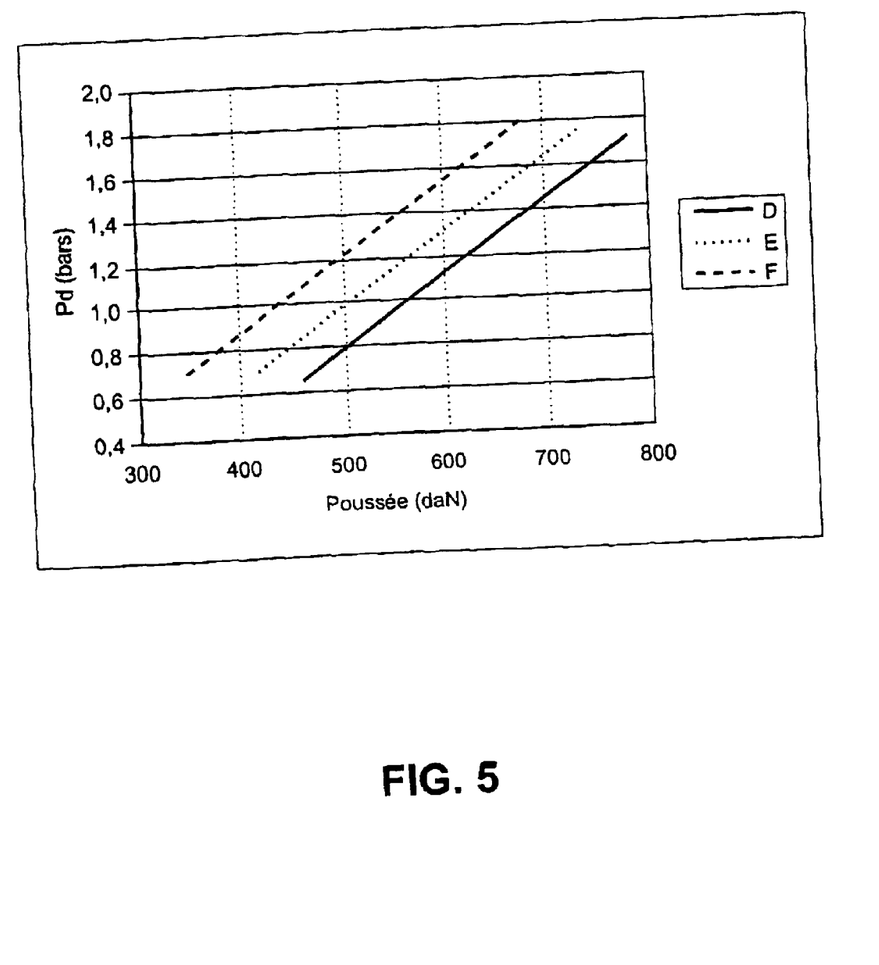
FIG. 5 shows the results obtained in the dynamic test according to the invention.
Figure 6:
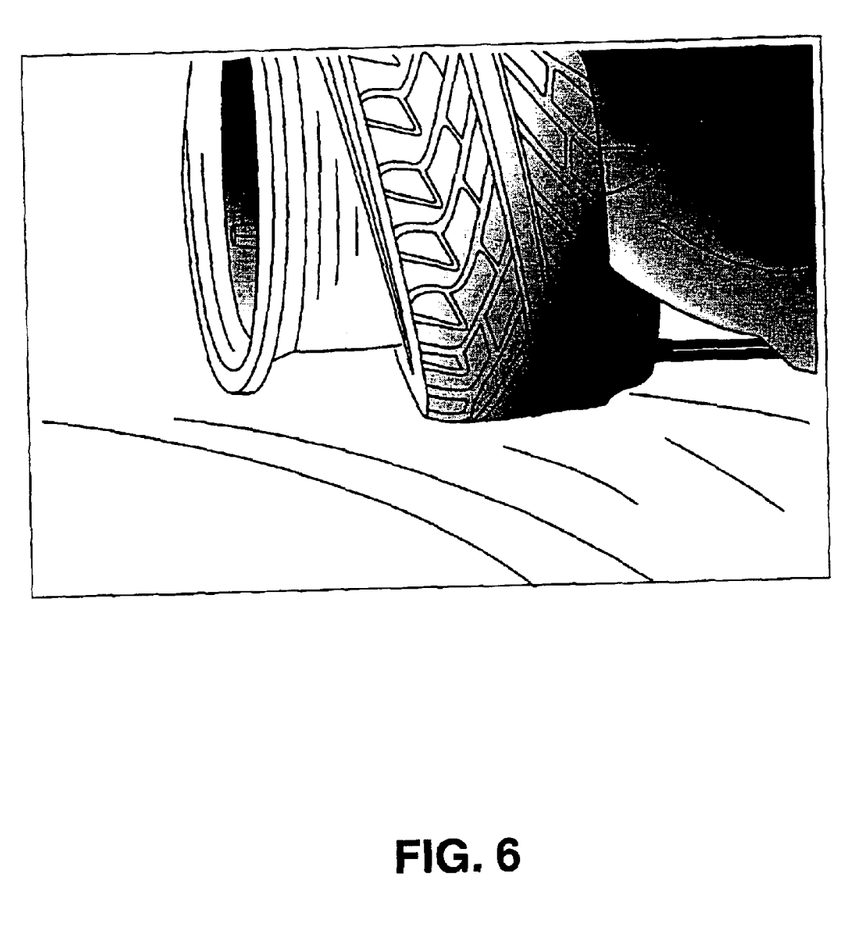
FIG. 6 represents a dynamic test according to the invention taken exactly at the moment when the test results in unseating: the air escaping from the inner cavity of the tire, owing to the loss of airtightness, can be clearly seen. The test drum is covered with a strip to "adherise" its surface. It can be seen that, in this "ultimate" phase of the test, it is the shoulder and the sidewall of the tire which are in contact with the test drum. This is one of the original features of the invention and probably one of the reasons for the remarkable correlation of the tests with actual on-track tests (82%).

The unseating pressure PD as a function of the drift and camber thrust t (linear regression and corresponding graph) is represented in the attached FIG. 5 for three different tires of dimensions 225/60 ZR 15, referenced D, E, F.

The highest-performance tire is the one with the lowest unseating pressure, that is to say the tire D.

Conclusions of the Tests

In 82% of the cases, the difference between the machine test and the vehicle test is less in value than 0.1 bar, which, as the person skilled in the art will understand, represents a correlation which is very much superior to the methods of the prior art.

The invention also covers all the embodiments and all the applications which will be directly accessible to the person skilled in the art on reading the present application, [word missing] his own knowledge, and possibly simple routine tests.

What is claimed is:

1. A process for an unseating test for a mounted rolling assembly comprising a rim, a tire without an inner-tube ("tubeless"), an inner cavity of the tire being inflated to a predetermined inflation pressure, comprising:

on a testing machine, applying a force on the tire with a test surface until unseating of the tire from the rim begins at a bead of the tire; and noting the force applied and the inflation pressure of the inner cavity of the tire, wherein, on the machine, the force is transmitted to at least a tread of the tire.

2. A process according to claim 1, wherein, before unseating, a shoulder and a sidewall of the tire come into contact with the test surface.

3. A process according to claim 1, wherein a start of the unseating is detected by an audible hissing of air escaping from the inner cavity of the tire.

4. A process according to claim 1, wherein the force and the inflation pressure are recorded continuously, including beyond a starting point of unseating.

5. A process according to claim 1, wherein the force is exerted on a crown of the tread and has at least one tangential component other than zero.

6. A process according to claim 5, wherein a longitudinal component of the force is not zero, the process including applying a driving or braking torque to at least one of the wheel and the rim.

7. A process according to claim 1, wherein a normal component of the force is zero and a coefficient of tire/test surface friction is substantially infinite.

8. A process according to claim 1, wherein longitudinal and normal components of the force are zero, and a tangential component of the force is merged with a transverse component of the force.

9. A process according to claim 1, wherein the process is static and includes arranging a rolling assembly on the test surface and subjecting the rolling assembly to a normal test force, applied to the crown of the tread, by at least one compression means.

10. A process according to claim 9, wherein the surface used is a plate adapted to adjust the coefficient of friction between the tread of the tire and said surface.

11. A process according to claim 1, wherein the process is dynamic and includes applying the force by causing the rolling assembly to roll on the test surface and imposing a drift relative to the test surface.

12. A process according to claim 11, wherein the test surface includes a rotatable cylinder.

13. A process according to claim 11, wherein the test surface includes a rolling plate and a strained-air film plate.

14. A process according to claim 11, wherein the rolling assembly is mounted on the test surface at a non-zero drift angle.

15. A process according to claim 14, wherein the rolling assembly is mounted on the test surface at a non-zero camber angle.

16. A process according to claim 15, wherein the rolling assembly is mounted on the test surface at a caster angle.

17. A machine for a tire unseating test, comprising a test surface for transmitting a test force to at least a portion of a tire tread intended to be in contact with the test surface, means for detecting a moment of unseating, and means for continuously recording the test force applied and an inflation pressure of the tire.

18. A machine according to claim 17, wherein the test surface is part of a test drum on which the tire is adapted to be positioned and caused to roll.

19. A machine according to claim 17, wherein the test surface includes a surface having a plane surface on which the tire is caused to roll.

20. A machine according to claim 19, wherein said plate is formed of a first microperforated fixed plate, comprising a number of microperforations into which a gas is injected under pressure, and a second solid plate which is displaceable and is in contact with the tire by a contact line, the two plates being mounted such that there is a gap between them.

* * * * *